United States Patent
Daniels

(10) Patent No.: US 11,769,332 B2
(45) Date of Patent: Sep. 26, 2023

(54) SENSOR FUSION FOR COLLISION DETECTION

(71) Applicant: Lytx, Inc., San Diego, CA (US)

(72) Inventor: Jesse Daniels, San Diego, CA (US)

(73) Assignee: Lytx, Inc., San Diego, CA (US)

(\*) Notice: Subject to any disclaimer, the term of this patent is extended or adjusted under 35 U.S.C. 154(b) by 564 days.

(21) Appl. No.: 16/902,025

(22) Filed: Jun. 15, 2020

(65) Prior Publication Data

US 2021/0387584 A1 Dec. 16, 2021

(51) Int. Cl.
| | |
|---|---|
| G06V 20/58 | (2022.01) |
| B60R 21/0136 | (2006.01) |
| G06F 18/25 | (2023.01) |
| G06N 3/08 | (2023.01) |
| H04W 4/38 | (2018.01) |
| H04W 4/90 | (2018.01) |
| G10L 25/30 | (2013.01) |
| G06N 3/045 | (2023.01) |

(52) U.S. Cl.
CPC .......... G06V 20/58 (2022.01); B60R 21/0136 (2013.01); G06F 18/251 (2023.01); G06N 3/045 (2023.01); G10L 25/30 (2013.01); H04W 4/90 (2018.02); *G06F 2218/14* (2023.01); *G06N 3/08* (2013.01); *H04W 4/38* (2018.02)

(58) Field of Classification Search
CPC ............ B60R 21/0136; G06K 9/00543; G06K 9/6289; H04W 4/90; H04W 4/38; G10L 25/30; G06N 3/0454
See application file for complete search history.

(56) References Cited

U.S. PATENT DOCUMENTS

| | | | |
|---|---|---|---|
| 7,284,769 B2 * | 10/2007 | Breed | B60C 11/24 180/282 |
| 7,317,987 B2 | 1/2008 | Nahla | |
| 10,295,363 B1 | 5/2019 | Konrardy | |
| 10,795,364 B1 * | 10/2020 | Abeloe | G05D 1/0221 |
| 10,814,815 B1 * | 10/2020 | Rishi | G06N 3/088 |
| 10,829,071 B1 * | 11/2020 | Christensen | B60R 21/0136 |
| 11,014,555 B1 * | 5/2021 | Beauchamp | H04W 4/023 |
| 11,100,387 B2 * | 8/2021 | Ravindran | G06Q 30/02 |
| 2016/0148356 A1 * | 5/2016 | Dabral | H04N 5/2355 382/166 |
| 2016/0322210 A1 * | 11/2016 | Raftery | G01N 33/487 |
| 2017/0095181 A1 * | 4/2017 | Hauenstein | A61B 5/1121 |
| 2018/0239968 A1 | 8/2018 | Gupta | |

(Continued)

FOREIGN PATENT DOCUMENTS

| | | | | |
|---|---|---|---|---|
| CA | 3046475 A1 | * | 12/2019 | ............. G06F 17/16 |
| CN | 111899170 A | * | 11/2020 | |

(Continued)

*Primary Examiner* — Daniel C Washburn
*Assistant Examiner* — Oluwadamilola M Ogunbiyi
(74) *Attorney, Agent, or Firm* — Van Pelt, Yi & James LLP

(57) ABSTRACT

A system for collision detection includes an interface and a processor. The interface is configured to receive sensor data from a plurality of sensors. The processor is configured to preprocess the sensor data using a set of preprocessing steps to create preprocessed sensor data, wherein the set of preprocessing steps comprises filtering, normalization, and alignment; process the preprocessed sensor data using a compound model to create a collision score; and provide the collision score.

18 Claims, 9 Drawing Sheets

(56) References Cited

U.S. PATENT DOCUMENTS

| | | | |
|---|---|---|---|
| 2019/0082276 A1* | 3/2019 | Crow | H04R 25/505 |
| 2019/0095577 A1* | 3/2019 | Tsao | C12Q 1/6851 |
| 2019/0138420 A1* | 5/2019 | Harutyunyan | G06F 11/301 |
| 2019/0166435 A1* | 5/2019 | Crow | H04R 25/43 |
| 2019/0197206 A1* | 6/2019 | Dembo | G06N 5/025 |
| 2019/0199602 A1* | 6/2019 | Zhang | G06F 8/31 |
| 2019/0212749 A1* | 7/2019 | Chen | G06V 10/82 |
| 2019/0214137 A1* | 7/2019 | Gupta | A61B 5/726 |
| 2019/0220014 A1* | 7/2019 | Bradley | G06N 20/00 |
| 2019/0258251 A1 | 8/2019 | Ditty | |
| 2019/0302766 A1* | 10/2019 | Mondello | G05D 1/0246 |
| 2019/0336824 A1* | 11/2019 | Fung | A63B 23/04 |
| 2019/0392288 A1 | 12/2019 | Wnuk | |
| 2020/0017117 A1* | 1/2020 | Milton | B60W 50/02 |
| 2020/0125845 A1* | 4/2020 | Hess | G06V 20/582 |
| 2020/0263531 A1* | 8/2020 | Fyfe | F04B 51/00 |
| 2020/0338723 A1* | 10/2020 | Sefati | A61B 34/20 |
| 2020/0342285 A1* | 10/2020 | Croxford | G06N 3/0454 |
| 2021/0048215 A1* | 2/2021 | Mirebrahim | G05B 19/042 |
| 2021/0142152 A1* | 5/2021 | Burkhart | G06N 3/08 |
| 2021/0171027 A1* | 6/2021 | Kang | G06V 20/58 |
| 2021/0197720 A1* | 7/2021 | Houston | G06V 10/764 |
| 2021/0269051 A1* | 9/2021 | McGill, Jr. | B60W 60/0025 |
| 2021/0287297 A1* | 9/2021 | Hayward | G06F 16/29 |
| 2021/0292829 A1* | 9/2021 | Brown | C12Q 1/6853 |
| 2021/0303695 A1* | 9/2021 | Grosse | G06F 17/18 |
| 2021/0312725 A1* | 10/2021 | Milton | G06N 3/0454 |
| 2022/0126864 A1* | 4/2022 | Moustafa | B60W 60/001 |

FOREIGN PATENT DOCUMENTS

| | | | | |
|---|---|---|---|---|
| CN | 111512646 B | * | 9/2021 | G10L 25/78 |
| DE | 102019105389 A1 | * | 8/2020 | |
| EP | 3591584 | | 1/2020 | |
| JP | 2009104663 A | * | 5/2009 | G07D 7/206 |
| KR | 20170010641 A | * | 2/2017 | A61B 5/05 |
| WO | WO-2020053148 A1 | * | 3/2020 | A61B 5/05 |
| WO | WO-2020153572 A1 | * | 7/2020 | G06N 3/08 |
| WO | WO-2021130066 A1 | * | 7/2021 | G06N 3/0454 |

* cited by examiner

SENSOR FUSION FOR COLLISION DETECTION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.). Typically an accelerometer signal is used for collision detection—for example, by identifying events where an accelerometer signal crosses a collision threshold value. For heavy vehicles, large instantaneous accelerations can be created by relatively mundane events, such as hitching a trailer or hitting a pothole, leading to false positive collision events. In addition, a collision between a heavy vehicle and a small passenger car may create only a small acceleration peak for the heavy vehicle, leading to missed acceleration events. This creates a problem of both excess false positive and false negative measurements that is not easily solved by simple means such as moving a threshold.

BRIEF DESCRIPTION OF THE DRAWINGS

Various embodiments of the invention are disclosed in the following detailed description and the accompanying drawings.

DETAILED DESCRIPTION

Figure 1:
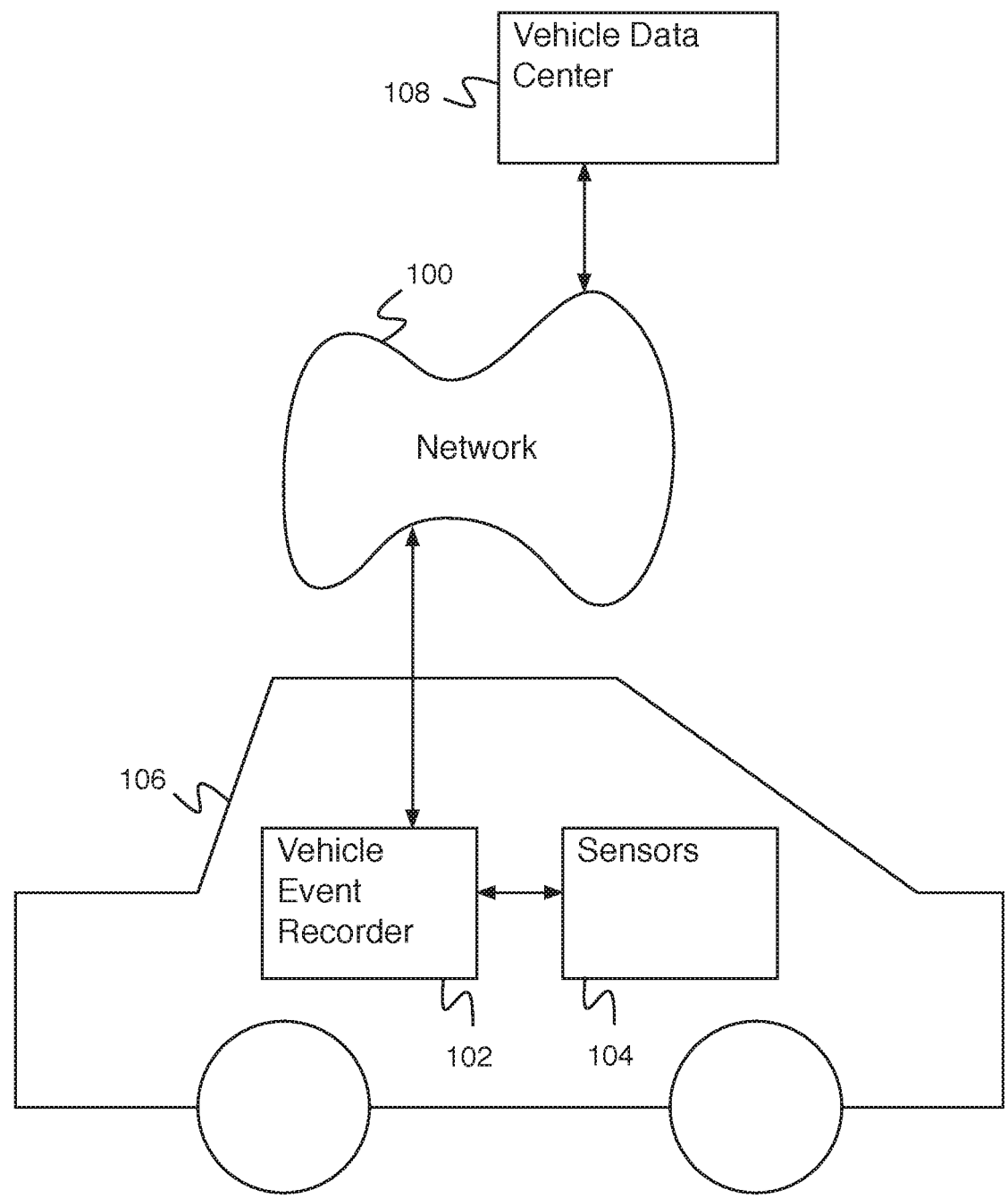
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for collision detection comprises an interface configured to receive sensor data from a plurality of sensors, and a processor configured to preprocess the sensor data using a set of preprocessing steps to create preprocessed sensor data, wherein the set of preprocessing steps comprises filtering, normalization, and alignment, process the preprocessed sensor data using a model to create a collision score, and provide the collision score.

A system for sensor fusion for collision detection comprises a vehicle event recorder system including a plurality of sensors. For example, the vehicle event recorder system includes an accelerometer, a gyroscope, a global positioning system (e.g., a GPS sensor), a speedometer, an audio sensor, a video sensor, etc. The system for sensor fusion for collision detection comprises a system for preprocessing data from a plurality of sensors and processing the preprocessed data using a model (e.g., a machine learning model, a deep learning model, a neural network model, etc.) to determine a collision score. A determination of a collision, a collision severity, and/or a resulting action to take is automatically made based on the collision score.

The system for sensor fusion receives sensor data from a plurality of available sensors—for example, from an accelerometer, a gyroscope, and a GPS. In some embodiments, GPS data is used to determine velocity data (e.g., by determining instantaneous velocity measurements using the difference of successive position measurements). A set of preprocessing steps is performed on the sensor data. For example, the set of preprocessing steps comprises bias removal (e.g., removal of a predetermined sensor bias), filtering (e.g., low-pass filtering, high-pass filtering, band-pass filtering, resonant filtering, smoothing, windowing, computation of a moving average, etc.), normalization (e.g., adjustment of the data statistics—for example, normalization of the data to a mean of 0 and a standard deviation of 1), alignment (e.g., adjustment of the data sampling to align data samples), sub-sampling (e.g., lowering of the sample rate), peak alignment (e.g., positioning of a data peak at a predetermined position within a data sample), length adjustment (e.g., data cropping and/or zero-padding in order to adjust a sample length to a predetermined length). The sensor data from the plurality of sensors is combined and provided as input to a model—for example, a first neural network model. The first neural network model processes the data to create an output. In some embodiments, the first neural network model output comprises the collision score. In some embodiments, received data is missing in part or entirely (e.g., GPS signal is not present due to drop outs in signal reception) and the missing data is replaced or padded with blank dummy data (e.g., zero padding).

In some embodiments, the system for sensor fusion additionally receives data from an audio sensor. Audio data comprises data sampled at a very different sampling rate than accelerometer data—for example, audio data is sampled at 20 kHz and accelerometer data is sampled at 100 Hz. Comparing sample measurements directly is neither practical nor meaningful. However, there is meaningful information to be extracted from the audio data. In order to include the audio data in the collision score determination, a parallel processing path is used, followed by a data fusion step. The audio data is preprocessed—for example, using filtering, length correction, alignment, and spectrogramming or mel spectrogramming. A spectrogram comprises a two-dimensional representation of audio data indicating frequency content over a series of time windows, creating an efficient summary of the audio content over time. A mel spectrogram comprises a spectrogram wherein the frequency values are transformed using a mel transformation, comprising a nonlinear frequency mapping to capture frequency distances as perceived by humans (e.g., pitches are linearly spaced on a mel scale in the event they are perceived by humans to be linearly spaced). The preprocessed data output (e.g., the spectrogram or mel spectrogram output) is provided as input to a model—for example, a second neural network model. The second neural network model processes the data to create an output. The second neural network model output is combined with the output of the first neural network model to form a third model input. For example, the output of the first neural network model and the second neural network model are concatenated, interleaved, multiplied, XOR'd, etc. to form the third model input. The third model input is provided as an input to a third model, for example, a third neural network model comprising a dense layer neural network. The third neural network model output comprises a single value output comprising the collision score.

In some embodiments, the collision score is provided as output from the system for sensor fusion. In some embodiments, a collision determination is made based at least in part on the collision score (e.g., by comparing the collision score to a collision threshold) and the collision determination is provided. In some embodiments, a collision severity is determined based at least in part on the collision score (e.g., by determining which of a set of collision severity buckets the collision score falls into), and the collision severity is provided. In some embodiments, indications to take actions of a set of actions are determined based at least in part on the collision score (e.g., each action is associated with a collision threshold or a set of buckets specific to that action, and an indication to take the action is made based on whether the collision score crosses the collision threshold or falls into an appropriate bucket). For example, actions of the set of actions comprise archiving and/or fetching data (e.g., providing instructions to a vehicle event recorder and/or digital video recorder to archive collision data and provide data to a vehicle data center where it can also be archived), providing data to a human reviewer, providing an indication to a client, storing data (e.g., storing data for insurance purposes), creating a report, initiating a 911 call, initiating driver contact for a client operator, providing a request for a tow truck, providing a request for a backup truck for cargo transfer, notifying a client, or providing a request for an ambulance.

In some embodiments, the system for collision detection improves the computer by making a more accurate determination for collisions. This improves efficiency for the use of storage and processing in that more appropriate data is stored, transferred, and/or processed making the computer better by making better use of memory, transmission bandwidth, and processor resources.

In some embodiments, the system improves the computer by having a specific configuration of models (e.g., parallel models processing specific sensor inputs—for example, separate models for GPS, gyroscopic, accelerometer data, etc.) whose outputs are then combined as inputs to an additional model (e.g., a model that serially processes data from the parallel models) for detection of collisions. This specific configuration of models improves computation of detection of collisions.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system sensors (ADAS) sensors, a GPS, outdoor temperature sensors, moisture sensors, line tracker sensors (e.g., laser line tracker sensors), a lane change sensor, an AMBER alert sensor (e.g., a radio configured to receive AMBER alert data), etc. Vehicle state sensors comprise internal vehicle state sensors—for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night). Vehicle event recorder 102 communicates with vehicle data center 108 via network 100.

When vehicle 106 travels, vehicle sensors 104 capture sensor data (e.g., video data, audio data, RADAR data, LIDAR data, accelerometer data, gyro data, GPS data, etc.). The sensor data is received by vehicle event recorder 102. For example, sensor data comprises digital data captured at a sampling rate—for example, a sampling rate indicated by vehicle event recorder 102 or an internally determined sampling rate. Vehicle event recorder 102 uses the sensor data to determine events (e.g., collision events, hazardous maneuver events, distracted driving events, etc.). For example, vehicle event recorder 102 comprises an interface configured to receive sensor data from a plurality of sensors and a processor configured to preprocess the sensor data using a set of preprocessing steps to create preprocessed sensor data, wherein the set of preprocessing steps comprises filtering, normalization, and alignment, process the preprocessed sensor data using a model to create a collision score, and provide the collision score.

Figure 2:
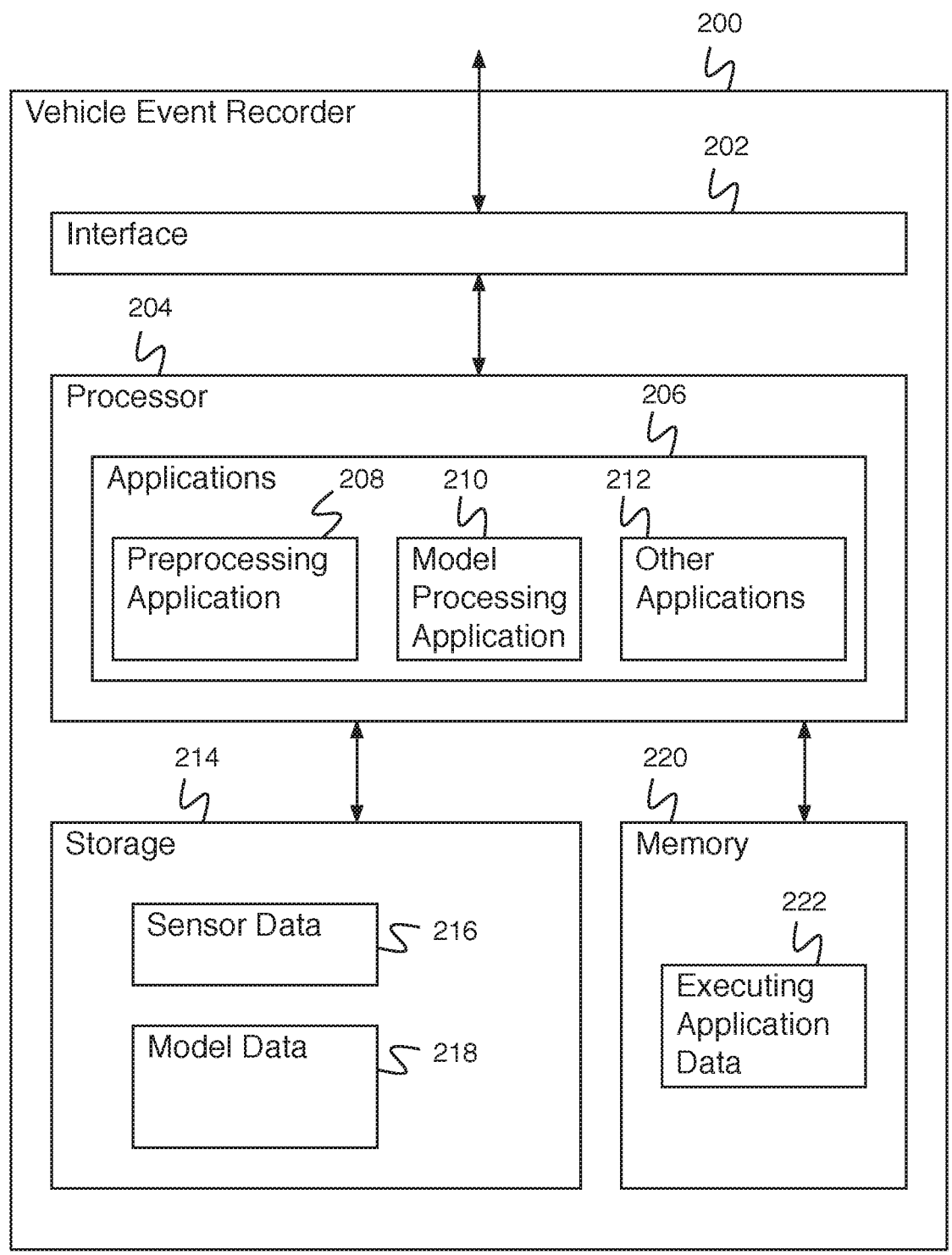
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. For example, interface 202 comprises an interface for receiving sensor data, receiving network communications, providing an indication of an anomalous event, providing sensor data, providing communications, etc. Processor 204 comprises a processor for executing applications 206. Applications 206 comprise preprocessing application 208, model processing application 210, and other applications 212. Preprocessing application 208 comprises an application for filtering, normalization, alignment, bias removal, subsampling, sample shortening, sample padding, spectrogramming, and/or mel spectrogramming. Model processing application 210 comprises an application for processing one or more models—for example, one or more neural network models, machine learning models, deep learning models, or any other appropriate models. Other applications 212 comprise any other appropriate applications (e.g., a communications application, a data storage and retrieval application, a web browser application, a user interface application, a data analysis application, etc.). In some embodiments, vehicle event recorder 200 comprises a system for collision detection, comprising an interface configured to receive sensor data from a plurality of sensors, and a processor configured to preprocess the sensor data using a set of preprocessing steps to create preprocessed sensor data, wherein the set of preprocessing steps comprises filtering, normalization, and alignment, process the preprocessed sensor data using a model to create a collision score, and provide the collision score. Storage 214 comprises sensor data 216 (e.g., sensor data received from a set of sensors) and model data 218 (e.g., data describing a model used by model processing application 210). Memory 220 comprises executing application data 222 comprising data associated with applications 206.

Figure 3:
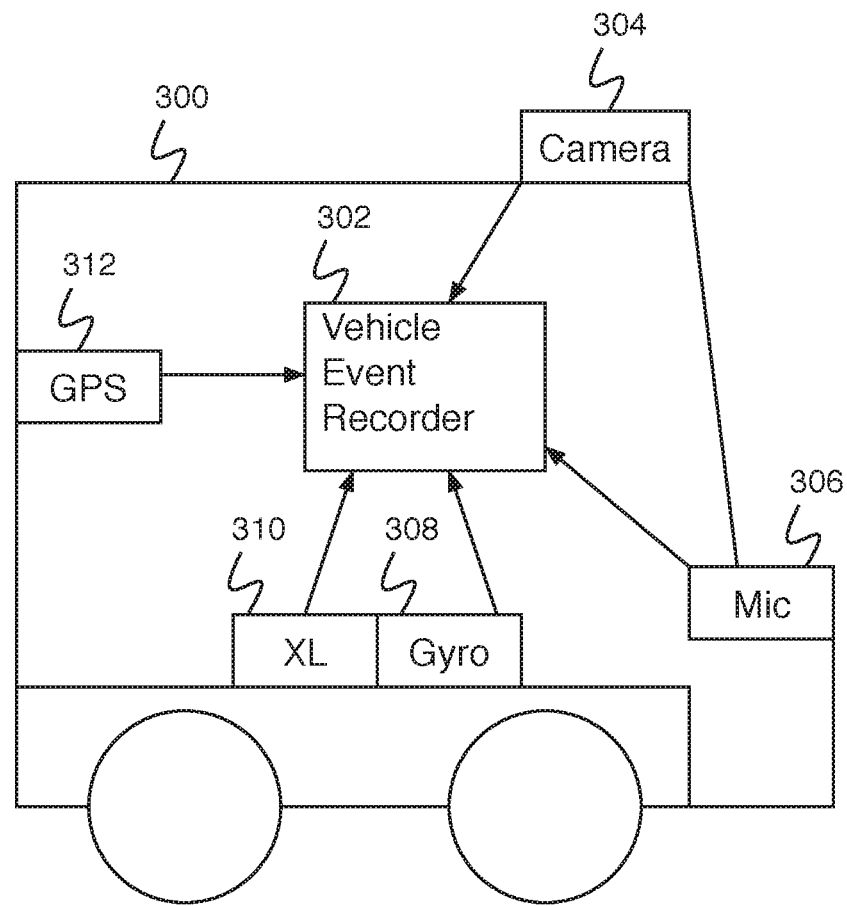
FIG. 3 is a block diagram illustrating an embodiment of a set of sensors coupled to a vehicle event recorder on a vehicle.

FIG. 3 is a block diagram illustrating an embodiment of a set of sensors coupled to a vehicle event recorder on a vehicle. In the example shown, vehicle 300 comprises vehicle event recorder 302 and a set of sensors. In some embodiments, vehicle event recorder 302 comprises vehicle event recorder 102 of FIG. 1. In the example shown, vehicle event recorder 302 is coupled to camera(s) 304, mic 306, gyro 308, accelerometer (XL) 310, and GPS 312. Camera(s) 304 comprises one or more cameras for providing video data to vehicle event recorder 302—for example, comprising forward facing video cameras, side facing video cameras, rear facing video cameras, inward facing video cameras, etc. Mic 306 comprises one or microphones for providing audio data to vehicle event recorder 302—for example, comprising left side microphones, right side microphones, front microphones, rear microphones, underside microphones, cabin microphones, trailer microphones, etc. Gyro 308 comprises a gyroscope for providing angular rate data to vehicle event recorder 302—for example, roll rate data, pitch rate data, or yaw rate data. XL 310 comprises an accelerometer for providing acceleration data to vehicle event recorder 302—for example, forward acceleration, lateral acceleration, vertical acceleration, tilt, etc. GPS 312 comprises a GPS system for providing location data to vehicle event recorder 302. For example, location data from GPS 312 can be differenced by vehicle event recorder 302 to determine velocity data (e.g. an instantaneous velocity can be computed by determining the distance and direction between two GPS location measurements and dividing the distance by the time between measurements).

Figure 4:
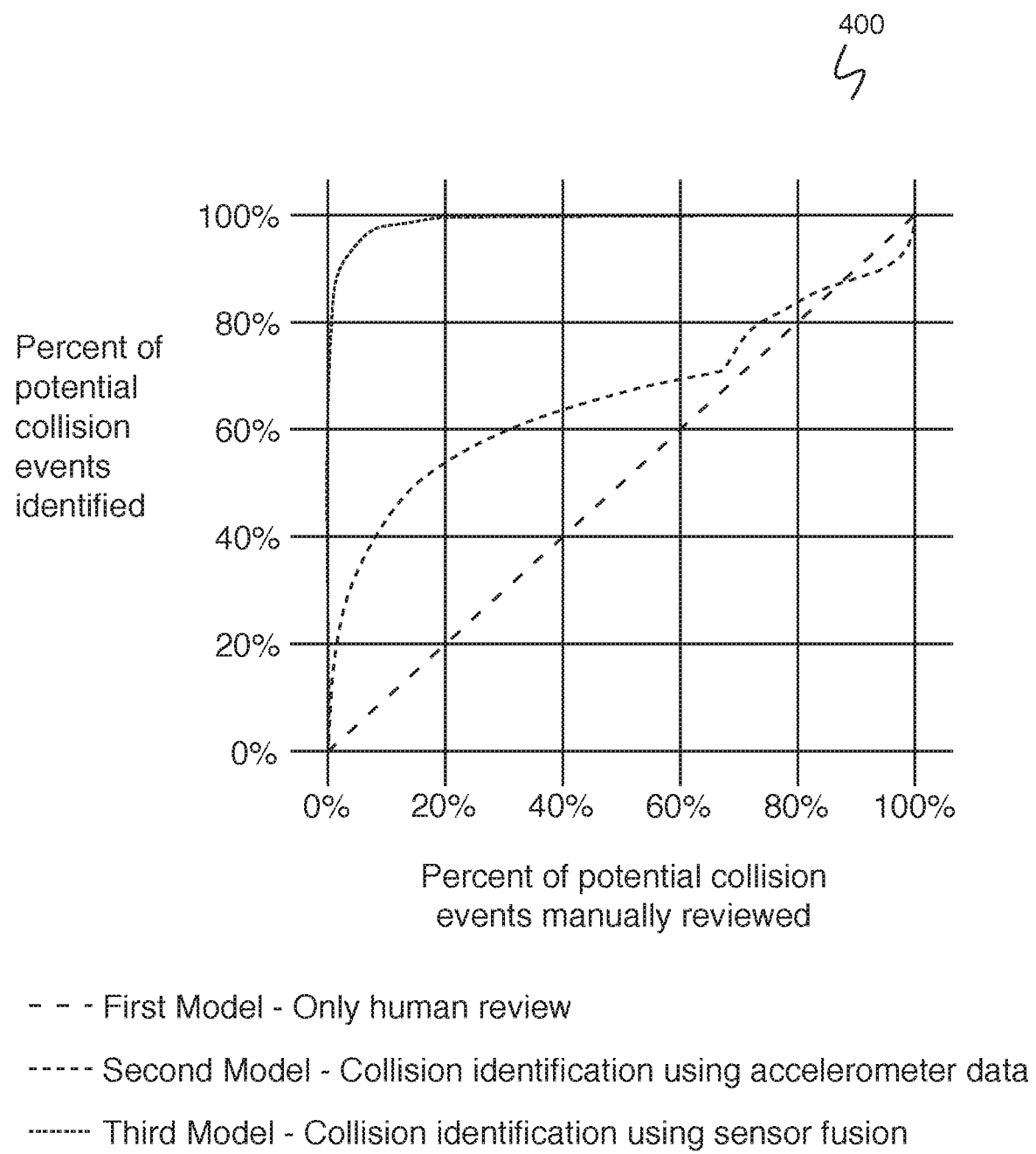
FIG. 4 is a diagram comprising a line graph illustrating a set of relationships between a fraction of collision events identified and a fraction of potential collision events reviewed by a human reviewer.

FIG. 4 is a diagram comprising a line graph illustrating a set of relationships between a fraction of collision events identified and a fraction of potential collision events reviewed by a human reviewer. For example, line graph diagram 400 illustrates the relationship between the fraction of collision events identified and a fraction of potential collision events reviewed by a human reviewer for three different collision identification systems. A first collision identification system comprises a hypothetical system wherein no determination is made regarding whether a potential collision event comprises a collision event, leaving identification of collision events solely to a human reviewer. The fraction of identified collision events for the first collision identification system is equal to the fraction of collision events reviewed. A second collision identification system comprises a typical previous model of collision identification system, comprising a system for identifying a collision using accelerometer data. For example, the system for identifying a collision using accelerometer data comprises a system for identifying a collision by thresholding accelerometer data or a system for identifying a collision by filtering and thresholding accelerometer data. The second collision identification system performs advantageously compared to the first collision identification system up to approximately 65% of potential collision events (e.g., the second collision identification system is able to identify some collision events without human review, but once 65% of potential collision events are reviewed, the second collision identification system performs effectively no better than leaving detection to human review). The second collision identification system is only able to identify 100% of collisions when all 100% of potential collision events are subject to human review. A third collision identification system comprises a system utilizing sensor fusion for collision detection. The third collision identification system is able to identify over 80% of collisions with no human review, and 100% of collisions are identified when only 20% of potential collision events are subject to human review. The third model, which identifies collisions using sensor fusion, significantly out performs human review and using only accelerometer data in that the third model identifies 100% of the collisions using the automated system and an additional human review of only 20% of the cases.

Figure 5:
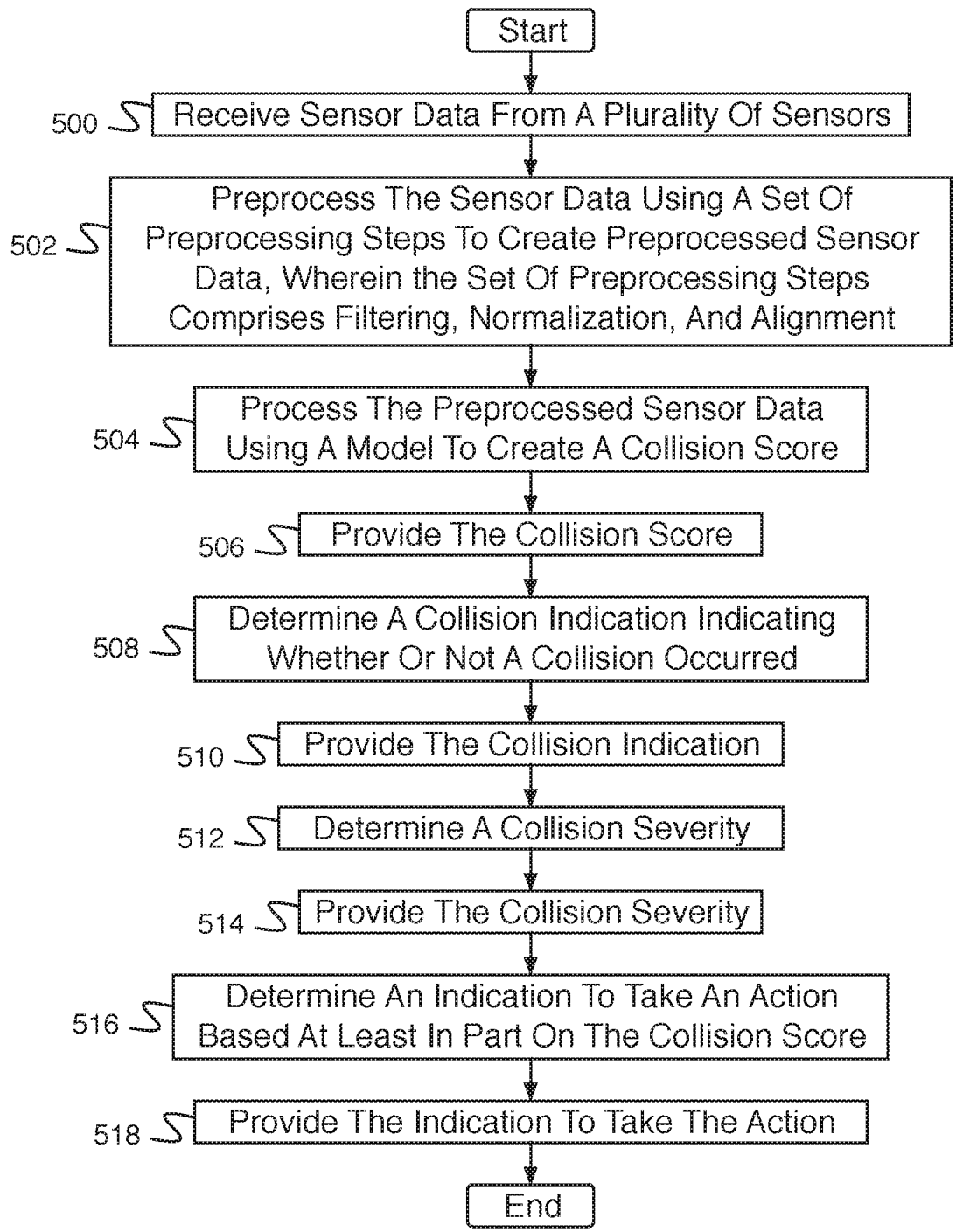
FIG. 5 is a flow diagram illustrating an embodiment of a process for collision detection.

FIG. 5 is a flow diagram illustrating an embodiment of a process for collision detection. In some embodiments, the process of FIG. 5 is executed by vehicle event recorder 102 of FIG. 1. In the example shown, in 500, sensor data is received from a plurality of sensors. For example, sensor data is received from two or more of video recorders, audio recorders, accelerometers, gyroscopes, vehicle state sensors, proximity sensors, ADAS sensors, GPS, outdoor temperature sensors, moisture sensors, line tracker sensors, a lane change sensor, an AMBER alert sensor, etc. In 502, the sensor data is preprocessed using a set of preprocessing steps to create preprocessed sensor data, wherein the set of preprocessing steps comprises filtering, normalization, padding, and alignment. In some embodiments, received data is missing in part or entirely (e.g., GPS signal is not present due to drop outs in signal reception) and the missing data is replaced or padded with blank dummy data (e.g., zero padding); for example, it is determined whether any received sensor data is missing and in response to determining that received sensor data is missing, padding or generating sensor data with null data (e.g., zeros, constant, or neutral data). In 504, the preprocessed sensor data is processed using a model to create a collision score. In 506, the collision score is provided. In 508, a collision indication indicating whether or not a collision occurred is determined. For example, a collision indication is determined and/or provided by comparing the collision score to a collision threshold (e.g., indicate collision in response to the collision score being greater than (or greater than or equal to) the collision threshold, less than (or less than or equal to) the collision threshold, etc.). In 510, the collision indication is provided. For example, the collision indication is provided to a user, an administrator, a database, a vehicle event recorder, etc. In 512, a collision severity is determined. For example, the severity calculated based at least in part of the collision score (e.g., is equal to the score, is a linear function of the score, is a nonlinear function of the score, etc.). In 514, the collision severity is provided. In 516, an indication to take an action is determined based at least in part on the collision score. For example, taking an action comprises fetching data, providing data to a human reviewer, providing an indication to a client, storing data, creating a report, initiating a 911 call, initiating driver contact for a client operator, providing a request for a tow truck, providing a request for a backup truck for cargo transfer, providing a request for an ambulance. In some embodiments, each action is associated with a collision score threshold. The determined collision score is compared with the collision score threshold for each available action. An indication to take an action or actions for which the collision score threshold is lower than the determined collision score is determined. In 518, the indication to take the action is provided.

Figure 6:
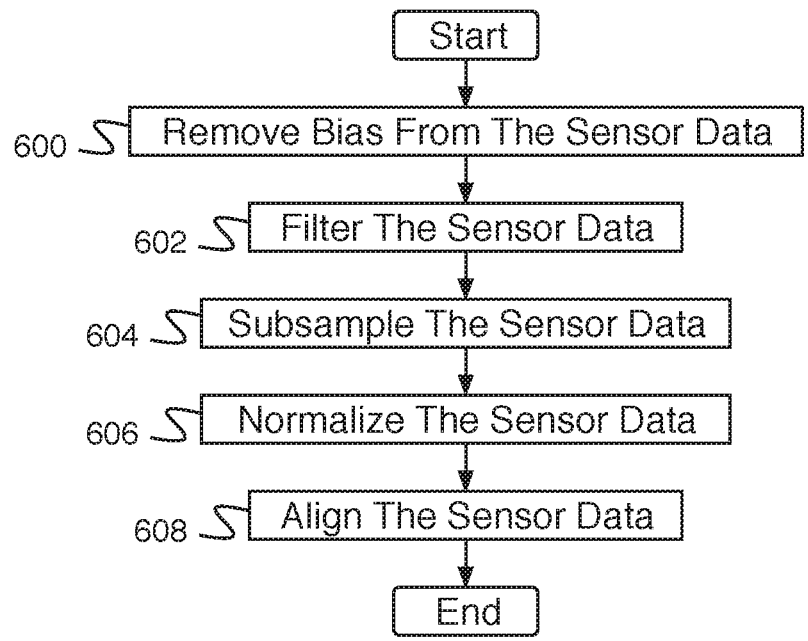
FIG. 6 is a flow diagram illustrating an embodiment of a process for preprocessing sensor data.

FIG. 6 is a flow diagram illustrating an embodiment of a process for preprocessing sensor data. In some embodiments, the process of FIG. 6 implements 502 of FIG. 5. In the example shown, in 600, bias is removed from the sensor data. For example, sensor data comprises accelerometer data, gyro data, GPS data, speedometer data, etc. Removing bias from sensor data comprises processing data to remove a bias associated with the sensor. For example, a bias comprises a calibration factor measured for the specific sensor. A calibration factor can be an offset, a linear calibration factor, a quadratic calibration factor, etc. In 602, the sensor data is filtered. For example, filtering comprises low pass filtering, smoothing using a moving average, high pass filtering, band pass filtering, resonant filtering, windowing, computation of a moving average, etc. In 604, the sensor data is subsampled. For example, subsampling comprises reducing the sample rate (e.g., from 100 Hz to 20 Hz) in order to reduce a required computational power. In 606, the sensor data is normalized. For example, normalization comprises adjustment of the sensor data statistics (e.g., subtraction of the sensor data mean to adjust the sensor data mean to 0, and/or division by the sensor data standard deviation to adjust the sensor data standard deviation to 1). In 608, the sensor data is aligned. For example, alignment comprises timestamp alignment or peak alignment. Timestamp alignment comprises adjusting sensor data measurements for sensors sampled at different times in order to synchronize the sensor data sampling. For example, timestamp alignment comprises data interpolation. Peak alignment comprises positioning of a data peak at a predetermined position within a data sample. In some embodiments, peak alignment comprises removal of data from an end of a data sample or padding (e.g., zero padding) of data on the end of a data sample. In some embodiments, the output comprises 128 elements representing the 12$s$ of speed (e.g., as derived from GPS data), gyro, and accelerometer data. In some embodiments, they are the derived outputs of the InceptionTime neural network architecture applied to 8 element×240 timestep inputs. The 8 inputs are decomposed as 3 accelerometer readings (x, y, z), 3 gyroscope readings (yaw, pitch, roll), 1 GPS velocity reading, and 1 derived feature indicating the timestep. The 240 timestep inputs are derived by downsampling (or interpolating in the case of GPS speed reading) the inputs from 100 hz to 20 hz (12 s*20 samples/s=240 samples).

Figure 7:
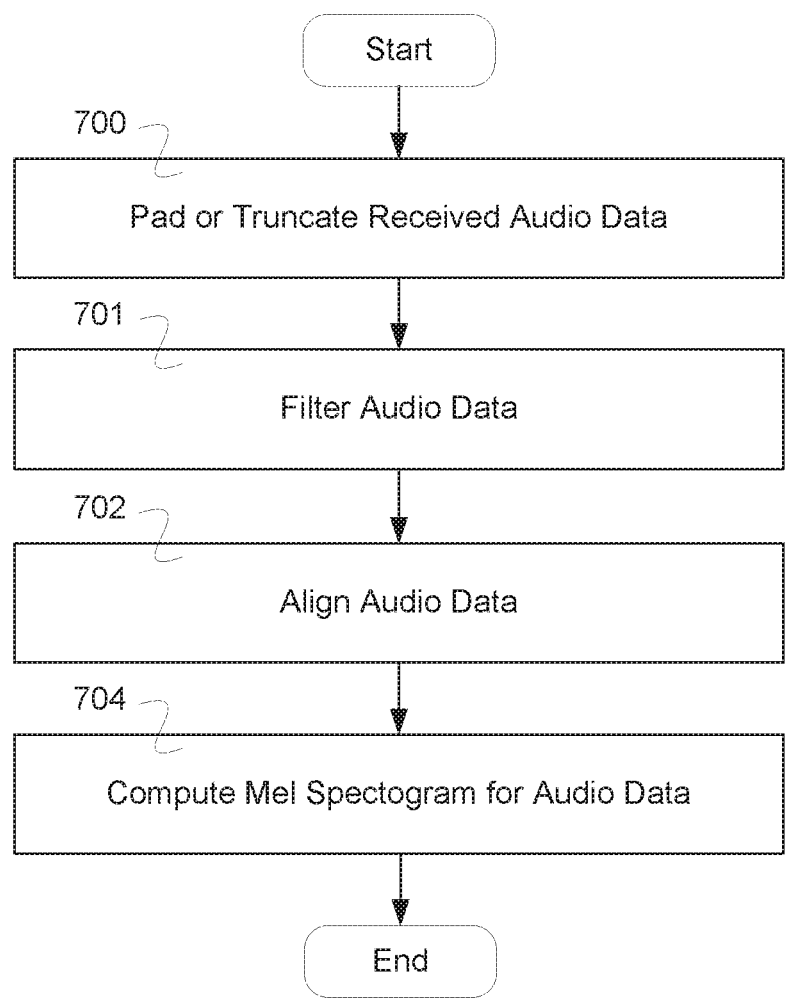
FIG. 7 is a flow diagram illustrating an embodiment of a process for preprocessing audio data.

FIG. 7 is a flow diagram illustrating an embodiment of a process for preprocessing audio data. In some embodiments, the process of FIG. 7 implements 502 of FIG. 5, wherein the data comprises audio data. In 700, the received audio data is padded or truncated, if necessary. For example, the raw audio data (e.g., data at 16 k samples/sec) is padded or truncated for a standard length for a 12 s data set. In 701, the audio data is filtered. In various embodiments, the audio data is filtering comprises low pass filtering, high pass filtering, band pass filtering, resonant filtering, windowing, computation of a moving average, or any other appropriate filtering. In some embodiments, the audio data is not filtered and step 701 is omitted. In 702, the audio data is aligned. For example, alignment comprises peak alignment (e.g., positioning of a data peak at a predetermined position within a data sample like 8 s before the triggering event and 4 s after). In 704, a mel spectrogram is computed for the audio data. For example, a mel spectrogram comprises a two dimensional representation of an audio sample, comprising a mel power spectrum changing across the time period of the audio sample, wherein the mel power spectrum comprises a non-linear transformation of a frequency power spectrum, representing a human perceived closeness of pitch. In some embodiments, the mel spectrogram output includes N bins of frequency for M time slices over the data time. In some embodiments, the mel spectrogram computation, the input is a 12-second audio clip with a sample rate of 16 Khz (192 k total samples (12 s*16 k/s)). In some embodiments, computing the spectrogram, a sliding window fast-fourier transform is moved over the input samples. For example, the window length or frame length is 512. In progressing from one window of data to the next, there is a 50% overlap, which corresponds to a frame step of 256 (512/2). When this moving window is applied across the full 12 seconds of data, it produces 192 k/256 steps=750 time steps.

In various embodiments, the process of FIG. 6 and FIG. 7 are performed in parallel or serially to achieve the function of 502 of FIG. 5.

Figure 8:
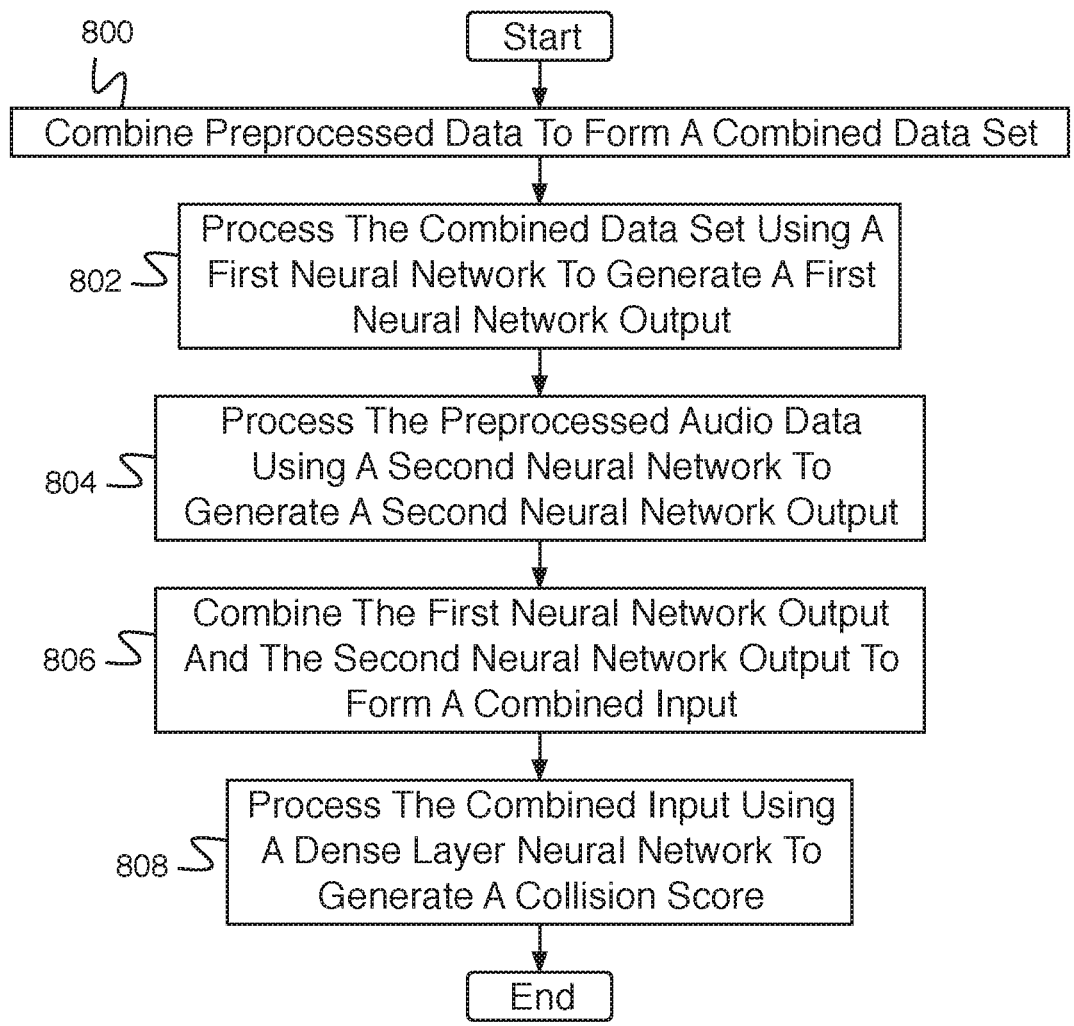
FIG. 8 is a flow diagram illustrating an embodiment of a process for processing preprocessed sensor data using a model to create a collision score.

FIG. 8 is a flow diagram illustrating an embodiment of a process for processing preprocessed sensor data using a model to create a collision score. In some embodiments, the process of FIG. 8 implements 504 of FIG. 5. In the example shown, in 800, preprocessed data is combined to form a combined data set. In some embodiments, preprocessed gyroscope data, accelerometer data, and GPS data are combined to form a combined data set. In 802, the combined data set is processed using a neural network to generate a first neural network output. In 804, preprocessed audio data is processed using a second neural network to generate a second neural network output. In 806, the first neural network output and the second neural network output are combined to form a combined input. For example, the first neural network output and the second neural network output are concatenated. In various embodiments, the first neural network output and the second neural network output are interleaved, multiplied, XOR'd, or any other appropriate manner of combining instead of being concatenated. In 808, the combined input is processed using a dense layer neural network to generate a collision score.

In some embodiments, 802 and 804 are processed in parallel after 800 and prior to 806. In some embodiments, the system uses a compound model for processing sensor data. In some embodiments, the compound model comprises three models. In some embodiments, the compound model comprises two neural networks and a dense layer network. In some embodiments, the compound model comprises two models in parallel whose combined outputs are input to a third model. In some embodiments, a first set of sensor data is processed using a first model (e.g., a neural network). In some embodiments, the first set of sensor data comprises GPS data, accelerometer data, and gyroscope data. In some embodiments a second set of sensor data is processed using as second model (e.g., a neural network). In some embodiments, the second set of sensor data comprises audio sensor data. In some embodiments, the output of the first model and the output of the second model are combined and input to a third model (e.g., a dense layer network).

Figure 9:
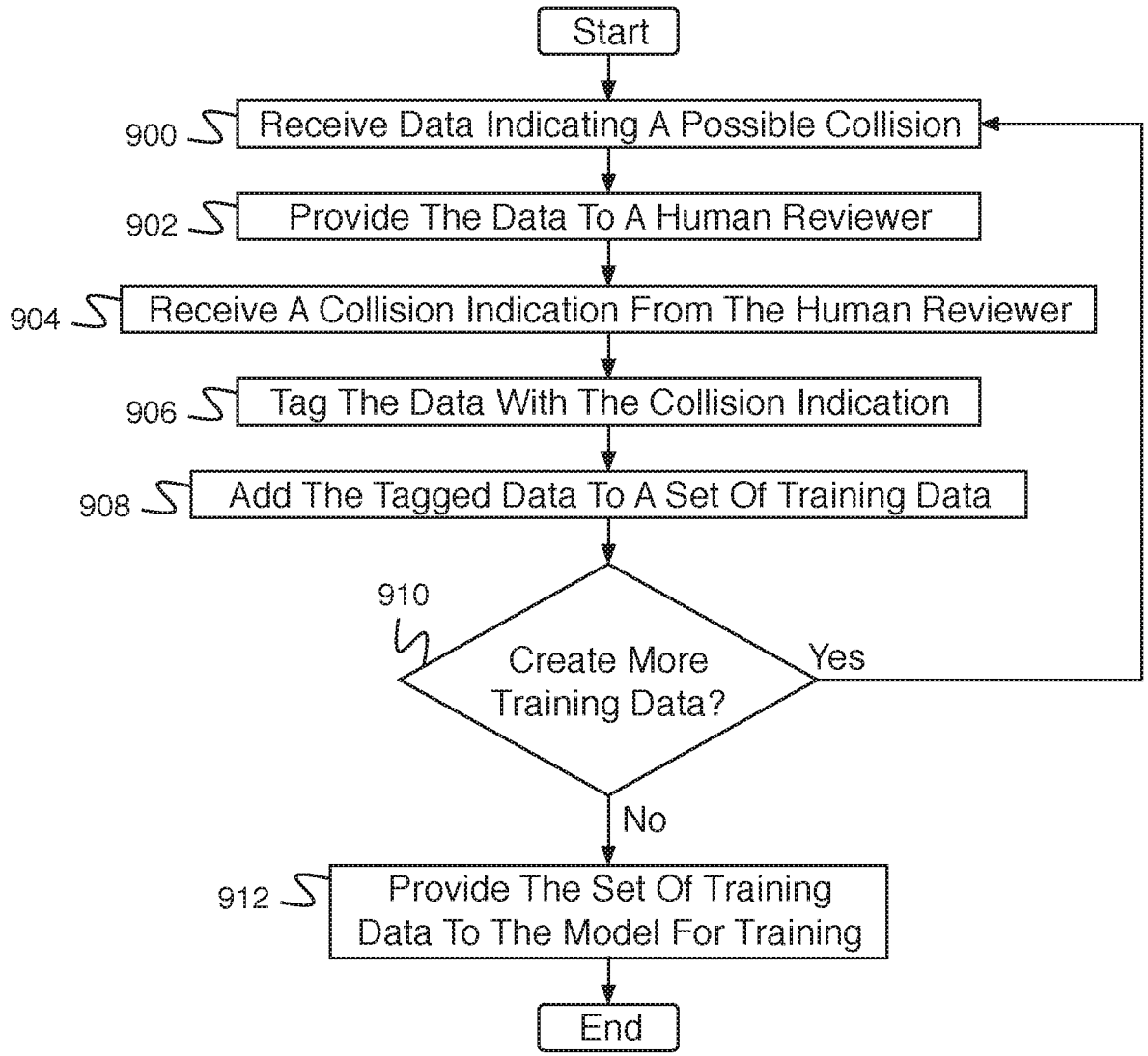
FIG. 9 is a flow diagram illustrating an embodiment of a process for preparing data for training.

FIG. 9 is a flow diagram illustrating an embodiment of a process for preparing data for training. In some embodiments, the process of FIG. 9 is executed by vehicle data center 108 of FIG. 1 for training a model. In some embodiments, the training process creates model data 218 of FIG. 2. In the example shown, in 900, data indicating a possible collision is received. In 902, the data is provided to a human reviewer. In 904, a collision indication is received from a human reviewer. For example a collision indication comprises binary data indicating whether or not a crash occurred. In 906, the data is tagged with the collision indication. In 908, the tagged data is added to a set of training data. In 910, it is determined whether to create more training data. In the event it is determined to create more training data, control passes to 900. In the event it is determined not to create more training data, control passes to 912. In 912, the set of training data is provided to the model for training. For example, the model is trained using the set of training data (e.g., using human reviewer data).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for collision detection, comprising:
an interface configured to receive sensor data from a plurality of sensors; and
a processor configured to:
preprocess the sensor data using a set of preprocessing steps to create preprocessed sensor data, wherein the set of preprocessing steps comprises filtering, normalization, and alignment;
process the preprocessed sensor data using a compound model to create a collision score, wherein a combined input generated from a first neural network output and a second neural network output are processed using a dense layer neural network of the compound model to generate the collision score; and
provide the collision score.

2. The system of claim 1, wherein the plurality of sensors comprises an accelerometer, a gyroscope, a GPS, and an audio sensor.

3. The system of claim 1, wherein the processor is further configured to determine a collision indication indicating whether a collision occurred based at least in part on the collision score.

4. The system of claim 3, wherein the processor is further configured to provide the collision indication.

5. The system of claim 1, wherein the processor is further configured to determine and/or provide a collision severity.

6. The system of claim 1, wherein the compound model comprises a neural network model, a machine learning model, a deep learning model, and/or a plurality of models.

7. The system of claim 1, wherein the processor is further configured to provide an indication to take an action based at least in part on the collision score, wherein the action comprises one or more of: fetching data, providing data to a human reviewer, providing a notification to a client, storing data, creating a report, initiating a 911 call, initiating driver contact for a client operator, providing a tow truck request, providing a backup truck for cargo transfer request, or providing an ambulance request.

8. The system of claim 1, wherein alignment comprises timestamp alignment or peak alignment.

9. The system of claim 8, wherein timestamp alignment comprises data interpolation.

10. The system of claim 8, wherein peak alignment comprises positioning of a data peak at a predetermined position within a data sample.

11. The system of claim 1, wherein the set of preprocessing steps additionally comprises bias removal, subsampling, sample shortening, sample padding, sample truncating, spectrogramming, and/or mel spectrogramming.

12. The system of claim 1, wherein sensor data comprises audio data that is preprocessed using filtering, length correction, alignment and/or mel spectrogramming.

13. The system of claim 1, wherein a first set of sensors preprocessed data are input to the first neural network of the compound model to generate a first neural network output.

14. The system of claim 1, wherein a second set of sensors preprocessed data is input to the second neural network of the compound model to generate a second neural network output.

15. The system of claim 1, wherein the model is trained using human reviewer data.

16. The system of claim 1, wherein the model is trained using binary data indicating whether or not a crash occurred.

17. A method for collision detection, comprising:
receiving sensor data from a plurality of sensors;
preprocessing, using a processor, the sensor data using a set of preprocessing steps to create preprocessed sensor data, wherein the set of preprocessing steps comprises filtering, normalization, and alignment;
processing the preprocessed sensor data using a compound model to create a collision score, wherein a combined input generated from a first neural network output and a second neural network output are processed using a dense layer neural network of the compound model to generate the collision score; and
providing the collision score.

18. A computer program product for collision detection, the computer program product being embodied in a non-transitory computer readable storage medium and comprising computer instructions for:
receiving sensor data from a plurality of sensors;
preprocessing the sensor data using a set of preprocessing steps to create preprocessed sensor data, wherein the set of preprocessing steps comprises filtering, normalization, and alignment;
processing the preprocessed sensor data using a compound model to create a collision score, wherein a combined input generated from a first neural network output and a second neural network output are processed using a dense layer neural network of the compound model to generate the collision score; and
providing the collision score.

* * * * *